Inventor:
George A. Frederick
By Bair, Freeman & Molinare
Attys.

United States Patent Office 3,519,834
Patented July 7, 1970

3,519,834
IMPACT SPECIMEN FRACTURE ANALYZER
George A. Frederick, Wheaton, Ill., assignor, by mesne assignments, to Peoples Development Inc., Chicago, Ill., a corporation of Delaware
Filed Feb. 1, 1966, Ser. No. 524,009
Int. Cl. G01n 21/48
U.S. Cl. 250—222       7 Claims

ABSTRACT OF THE DISCLOSURE

Method and apparatus for determining the transition temperature of metal wherein the surface characteristics of a ruptured metal impact fracture specimen are analyzed to determine the extent of failure in shear and in brittle fracture. The specimens are cooled to different preselected temperatures, and the specimens are broken by impact fracture while maintaining the specimen at its preselected temperature. The rupture surface of each specimen is subject to a plurality of beams of electromagnetic radiation and the intensity of the radiation reflected by the rupture surface of each specimen is measured. An electrical signal is produced and is related in magnitude to the intensity of the reflected radiation. The value of this signal is compared to preselected minimum and maximum values wherein the minimum and maximum values correspond to signals produced on test specimens which failed substantially and completely in shear and brittle fracture respectively.

---

This invention relates to novel apparatus and method for determining surface characteristics of metals and particularly the transition temperature of metals. In particular, the invention relates to novel apparatus and method for determining transition temperatures of metals used for manufacturing natural gas pipelines, e.g., steels whereby the surface of an impact fracture specimen of the metal to be tested is examined by light reflectance to determine surface characteristics.

By way of background, construction of long distance, high pressure, natural gas transmission lines requires knowledge of the physical properties of the metals used in pipeline construction. Design specifications for pipelines require economy in the utilization of metals since cost of the transmission line is nearly directly proportional to pipe diameter, wall thickness and length of the line.

A physical property, transition temperature, of the metal to be used in the pipeline is of extreme importance in the design of natural gas transmission lines. Transition temperature is defined as the temperature at which the metal fails upon impact testing, 50% in shear and 50% in brittle fracture, or cleavage. (Throughout this disclosure, the terms "cleavage" and "brittle fracture" will be used interchangeably.) Steels in common use in natural gas pipeline construction exhibit elastic properties at normal working temperatures. As the temperature of the metal is lowered, the elastic properties of the metal are also diminished until a temperature is reached where the metal becomes brittles and will exhibit brittle fracture.

The transition temperature is a function of the type of steel or metal used and is extremely important as a design criteria for determining the useful range of operating temperatures over which particular metals can be used. Operation of pipelines at temperatures below the transition temperature of the metal used may result in brittle failure of the pipeline at stresses much lower than allowable above the transition temperature. If the transition temperature is above temperatures to be encountered in operation, the wall thickness of the metal must be increased thereby increasing cost.

The transition temperature is becoming increasingly important as a design criteria due to the relatively recent use of cryogenic processes and products, i.e., processes and products involving low temperature liquids and gases. The use of natural gas in liquefied form as a method of storing large quantities of natural gas has received widespread attention. This material is a liquid at temperatures far below the transition temperature of most steels commonly used in pipeline construction. Use of liquid oxygen and liquid nitrogen in various metallurgical and processing applications is also becoming quite common and the use of liquid hydrogen in rockets and for propulsion mechanisms also involves cryogenic temperatures. The determination of the transition temperature of metals therefore has become increasingly important as a design criteria for construction materials.

One method of determining transition temperature is to use a metallurgical impact test such as the Charpy notched bar impact test, well-known in the art. In such test, a small bar of the material is prepared and a notch is placed on one side of the bar. The bar is held in a vise and struck a blow into the notch with a controlled amount of force. The characteristics of the surface of the break are noted after fracture.

To obtain a transition temperature by this method, a number of samples of notched bars are prepared, cooled to various temperatures and subjected to identical loading for impact testing and breaking. The surfaces of the test specimens after the break are examined by an experienced technician who can determine whether the surface broke in brittle failure or in shear or in what degree of each. The criteria level for these tests may be based on foot pounds of energy absorbed, percent of shear or cleavage (brittle fracture) in the fracture areas, or deformation of the cross section of the specimen.

In the most widely used method, the percent shear or cleavage is determined by visual analysis of the fracture area. One of the most difficult phases of the test is the reading and correlation of fracture surfaces. In the past, readings have been made by visual examination of skilled technicians. Certain aids have been used, principally enlargement of the surface by various magnification means. Photographs of specimen surfaces have also been taken and the areas have been outlined and then measured by a planimeter. Some examiners use a series of pictures which have been calibrated for comparison with the specimens and will then determine the extent of failure in shear and cleavage for a particular sample. A plot may be made of percent failure in shear versus temperature and the 50% point, i.e., the point at which a specimen failed 50% in shear and 50% in cleavage is designated the transition temperature.

Because of the uncertainties involved in estimating shear and cleavage areas from enlarged photographs or by direct observation, a novel device and method for determining the percentage failure in shear or cleavage has been developed. With this invention, test results are objectively established because the device eliminates the errors inherent in visual and subjective analysis by technicians.

It is therefore an object of this invention to provide an apparatus and method for determining objectively the surface characteristics of an impact fracture specimen to eliminate the human error inherent in visual inspection and analysis.

It is a further object of this invention to provide an apparatus and method whereby the surface characteristics of an impact fracture specimen can be analyzed to determine the extent to which the specimen failed by shear and by brittle fracture.

It is another object of this invention to provide an apparatus and method whereby surface characteristics of an impact fracture specimen, which was fractured at a preselected temperature, are analyzed by light reflectance to determine the extent of failure in shear and by brittle fracture and thus provide basis for determining the transition temperature of the material being tested.

Other objects will become apparent as the invention is more fully described hereinafter.

The invention is based on the difference in optical properties of the fracture surface of a test specimen which failed in shear and in brittle fracture or cleavage. It was observed that the granular structure of the face of the specimen exhibited characteristics that were highly light-reflective when the specimen failed in cleavage. The surface associated with this fracture appeared to be composed of crystals that protruded at sharp and random angles forming a bright, sugary looking surface. It was also observed that the specimens exhibiting shear fractures exhibited striated, dull gray looking surfaces with considerably less light reflection from that given by specimens which failed in cleavage. Combinations of both fractures results in surfaces of intermediate reflectivity.

I have found that an optical system can accurately sense the intermixing of these two surface characteristics in any given specimen and can provide fully objective and reproducible results in testing a series of specimens. This eliminates the uncertainties of subjective testing when using technicians to estimate surface characteristics.

Broadly, the device of my invention consists of a plurality of electric lamps which project light onto the rupture surface of a test specimen and a photoelectric cell for detecting the amount of reflection from the surface of the test specimen. The photo-electric cell is one leg of a conventional bridge circuit and any unbalance in the bridge circuit caused by light striking the photo cell produces a voltage proportional to the amount of light absorbed. This unbalance is based on reference to a specimen that is near zero percent shear fracture and one that is near 100 percent shear fracture. Provisions are made, hereinafter described, to calibrate the zero percent and 100 percent shear fracture range from various size specimens. An analysis is made by inserting a specimen into the reading station and when the specimen is in proper reading position, a switch closure is actuated enabling analysis to be performed. Although the preferred embodiment of my invention uses visible light in the optical system, it will be understood that any suitable electromagnetic radiation may be used. For example, we could use infrared or ultraviolet radiation and the optical system constructed and calibrated accordingly.

Figure 1:
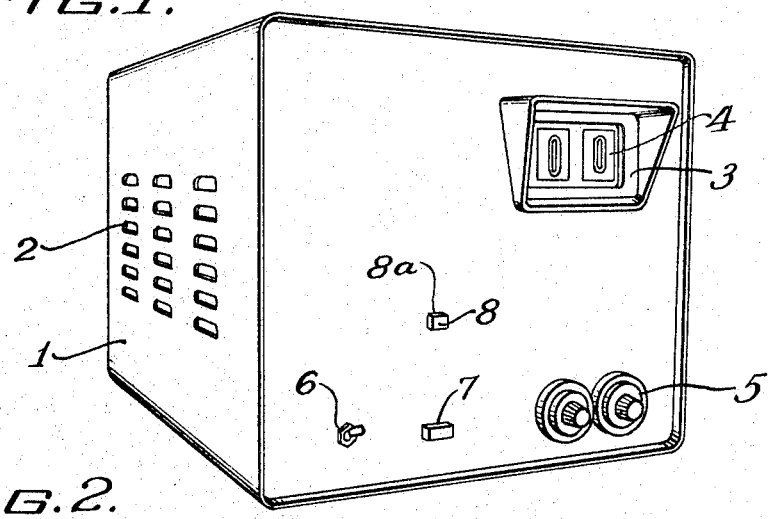
FIG. 1 is a perspective view showing a commercial embodiment of apparatus of the invention.

Referring to the drawings, FIG. 1 shows a typical commercial embodiment of the apparatus of my invention. Casing 1, preferably made of sheet metal, has cooling vents 2 on each side and is provided on its face with window 3 into which is positioned indicia indicating means 4 which are part of an electronic or electromechanical counter device. The counter is of any conventional type which can be calibrated to exhibit a numerical indication at 4 in response to electrical signals. Also provided on the face of the device are dials 5 for calibrating the instrument as described hereinafter. An on-off switch is provided at 6 and push button 7 is used to close switch 23 (FIG. 4) when a reading is desired. The ruptured end of a fracture specimen being analyzed is shown at 8 (FIGS. 1, 2 and 3), the specimen being inserted into the device through aperture 8a.

Figure 2:
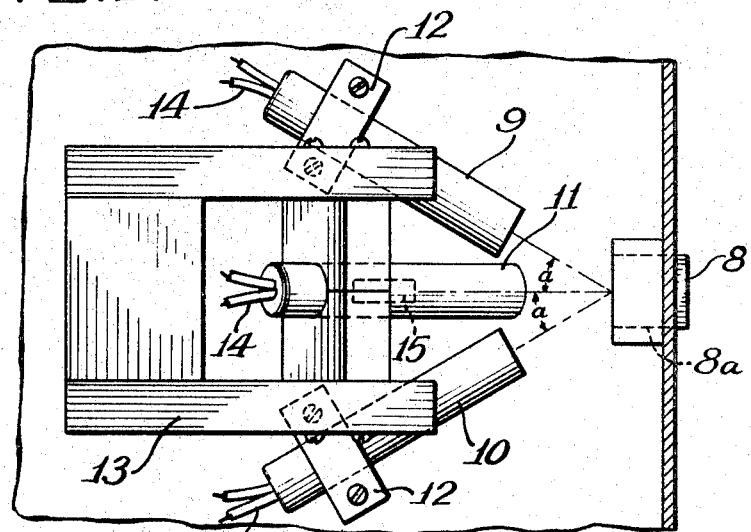
FIG. 2 is a plan view showing details of the apparatus of the invention.
Figure 3:
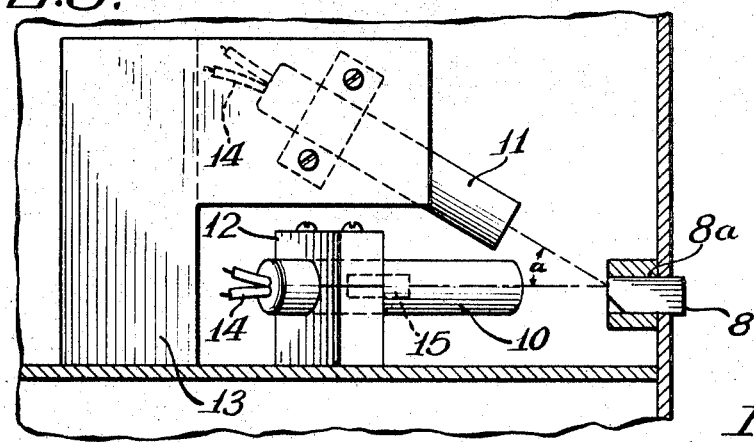
FIG. 3 is a side elevation showing details of the apparatus of the invention.

Referring to FIGS. 2 and 3, the measuring and detection portions of the apparatus comprise three electric lamps 9, 10 and 11 which are secured by suitable clamping means 12 to a supporting structure 13. The lamps may be any conventional lamps incandescent, when using a visible light system, and are enclosed in cylindrical casings which are arranged with their longitudinal axis at equal angles with respect to one another. That is, as shown in FIGS. 2 and 3 the angles $a$ are equal and the degree of angles $a$ is not critical. The particular value of angle $a$ will determine calibration characteristics. The lamps are powered through leads 14 by any conventional, well-filtered and regulated power source (not shown).

Located between the lowermost lamps 9 and 10 and below the uppermost lamp 11 is a photoelectric cell shown diagrammatically at 15. The cell may be any conventional photo-electric cell, well known in the art, and is arranged with its face open to the rupture surface of specimen 8 as it is inserted into the device so that part of the light which strikes specimen 8 from lamps 9, 10 and 11 is reflected and sensed by cell 15 which responds in known manner in relation to the intensity of reflected light.

Figure 4:
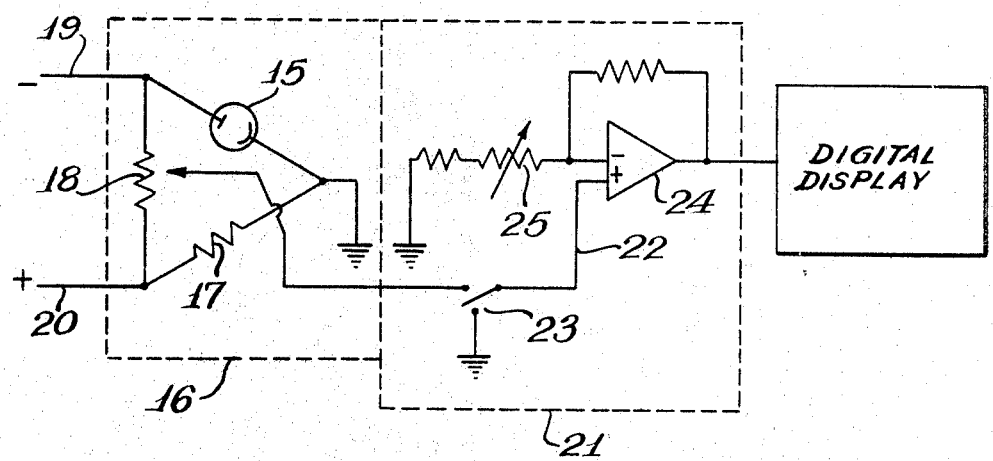
FIG. 4 is a circuit diagram.

Cell 15 is part of a bridge circuit shown generally at 16 in FIG. 4 which consists of resistors 17 and 18 and cell 15. Bridge circuit 16 is powered across leads 19 and 20, preferably by a 200 volt potential difference. A conventional adjustable feedback amplifier circuit is shown generally at 21 and consists of elements well known in the art. Input to amplifier 24 is provided through line 22 when switch 23 is closed by push-button 7 (FIG. 1). Amplifier 24 provides a signal to a conventional digital display section shown diagrammatically in FIG. 4. Variable resistor 25 is adjustable for calibration purposes as hereinafter described.

The device is calibrated so that a specimen of a particular metal of a particular size which failed in substantially 100 percent shear shows a 100 percent reading and a like specimen which failed in substantially 100 percent brittle fracture shows a 0 percent reading. To calibrate the device, the sample which failed in brittle fracture is inserted into aperture 8a and resistor 18 is adjusted while switch 23 is closed to give a zero reading on the digital display. Then the specimen which failed in shear is inserted and resistor 25 is adjusted while switch 23 is closed to give a 100 percent reading. Once calibrated for a particular size and composition specimen, the device may be used with all specimens of like size and composition.

To run a test, a specimen is inserted into aperture 8a and switch 23 is closed. A signal is then generated in the bridge circuit depending upon the voltage unbalance created by the intensity of light reflections from the specimen and the signal is fed to amplifier 24 through line 25, is amplified and displayed as a numerical value between zero and 100 on the digital display.

Figure 5:
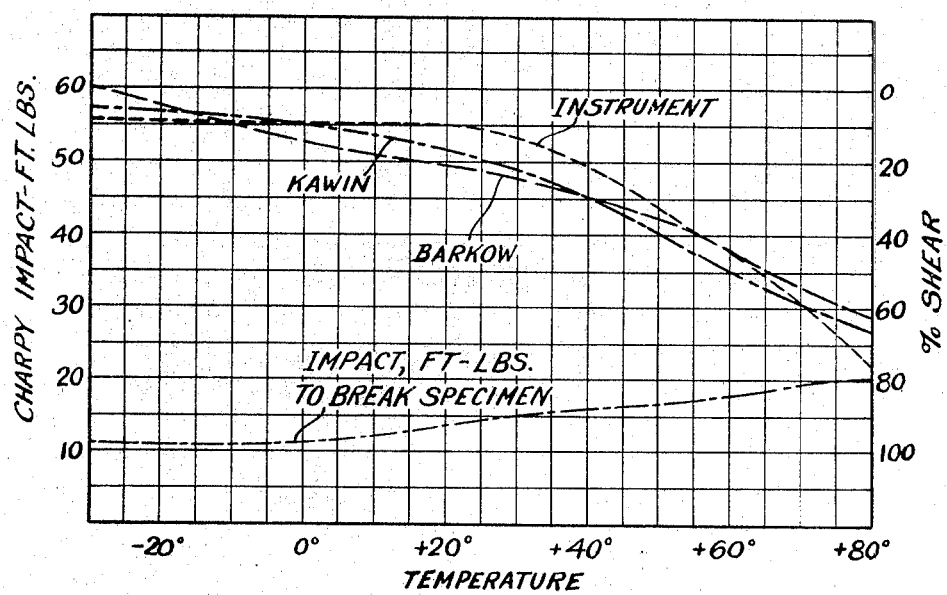
FIG. 5 is a graph showing typical test results using the apparatus and method of the invention.

Extensive tests have been made with my apparatus as above described to determine the reproducibility of the readings and to correlate the results of the analyzer readings with other optical methods for determining transition temperatures. These tests indicate that test results are completely reproducible and that they can be correlated very well with other methods. FIG. 5 shows a graphic comparison between the results obtained with the analyzer and visual analysis of two technicians, indicated as Barkow and Kawin. It is noted that the methods of Barkow and Kawin involve human judgment while the analyzer objectively detects the difference in light reflected from the fracture surface. Table 1 shows in tabular form the same data shown graphically in FIG. 5.

Tables 2 and 3 show similar data on samples of different composition.

TABLE 1
[Readings in percent shear]

| Specimen A, °F.: | Instrument | Barkow | Kawin |
|---|---|---|---|
| −20 | 9 | 5 | 6 |
| 0 | 9 | 14 | 10 |
| +20 | 10 | 20 | 16 |
| +40 | 20 | 29 | 29 |
| +60 | 44 | 44 | 49 |
| +80 | 75 | 62 | 65 |

Specimen A had the following composition, all percents being by weight: 0.28% C; 1.24% Mn; 0.017% P; 0.029% S; balance Fe.

TABLE 2
[Readings in percent shear]

| Specimen B, °F.: | Instrument | Barkow | Kawin |
|---|---|---|---|
| −20 | 24 | 30 | 28 |
| 0 | 70 | 60 | 67 |
| +20 | 96 | 95 | 98 |
| +40 | 97 | 97 | 100 |
| +60 | 97 | 97 | 100 |
| +80 | 98 | 98 | 100 |

TABLE 3
[Readings in percent shear]

| Specimen C, °F.: | Instrument | Barkow | Kawin |
|---|---|---|---|
| −20 | 12 | 10 | 5 |
| 0 | 14 | 20 | 15 |
| +20 | 24 | 30 | 15 |
| +40 | 34 | 37 | 24 |
| +60 | 48 | 45 | 63 |
| +80 | 80 | 70 | 73 |

Specimen C had the following composition, all percents being by weight: 0.28%; 1.14% Mn; 0.018% P; 0.026% S; balance Fe.

The analyzer of my invention may conveniently be used, if desired, to provide data for insertion to a computer for the final determination of the transition temperature. The interface and logic levels can be provided in the embodiment described herein and can conveniently be interfaced to a computer.

Those skilled in the art will recognize that various modifications can be made in the apparatus and method of my invention which I desire to be limited solely by the appended claims.

I claim:

1. A method for determining the transition temperature of metal wherein the surface characteristics of a ruptured metal impact fracture specimen are analyzed to determine the extent of failure in shear and in brittle fracture comprising (1) cooling each of a plurality of metal specimens to different preselected temperatures (2) breaking each of said specimens by impact fracture while each specimen is maintained at its respective preselected temperature (3) subjecting the rupture surface of each specimen to beams of electromagnetic radiation (4) measuring the intensity of radiation reflected by the rupture surfaces of each specimen (5) producing an electrical signal related in magnitude to the intensity of said reflected radiation and (6) comparing the value of said signal to preselected minimum and maximum values, said minimum and maximum values corresponding to signals produced upon testing specimens which failed substantially completely in shear and brittle fracture respectively.

2. Method for analyzing surface characteristics of a ruptured metal impact fracture specimen to determine the extent of failure of said specimen in shear and in brittle fracture comprising (1) breaking an input fracture specimen while maintaining said specimen at a preselected temperature (2) subjecting a ruptured surface of said specimen to beams of electromagnetic radiation (3) measuring the intensity of radiation reflected by the ruptured surface (4) producing an electrical signal related in magnitude to the intensity of said reflected radiation and (5) comparing the value of said signal to preselected minimum and maximum values, said minimum and maximum values corresponding to signals produced upon testing specimens which failed substantially completely in shear and brittle fracture respectively.

3. Apparatus for analyzing surface characteristics of a ruptured metal impact fracture specimen to determine the extent of failure of said specimen in shear and brittle fracture comprising a housing, means in said housing for supporting a rupture metal impact fracture specimen to be tested at least three incandescent lamps on said housing for directing beams of electromagnetic radiation to the rupture surface of said specimen, said lamps being arranged to direct beams of light to said surface along axes which are equiangular with respect to one another, sensing means for detecting the intensity of radiation reflected from said surface, means responsive to said sensing means to produce an electrical signal related in magnitude to the intensity of said reflected radiation and means responsive to said electrical signal to indicate the relative value of said signal between preselected maximum and minimum values, said maximum and minimum values corresponding to signals produced upon testing specimens which failed substantially completely in brittle fracture and shear respectively.

4. Apparatus of claim 3 wherein said electromagnetic radiation is visible light.

5. Apparatus of claim 3 wherein said sensing means is a photoelectric cell.

6. Method of claim 1 wherein said electromagnetic radiation is visible light.

7. Method of claim 2 wherein said electromagnetic radiation is visible light.

References Cited

UNITED STATES PATENTS

| 2,313,218 | 3/1943 | Brace et al. | 88—14 |
| 2,315,282 | 3/1943 | Snow | 88—14 |
| 2,739,246 | 3/1956 | Hunter | 250—220 |
| 2,882,785 | 4/1959 | Biesele | 88—14 |
| 3,131,557 | 5/1964 | Hoy | 88—14 |

WALTER STOLWEIN, Primary Examiner

U.S. Cl. X.R.

356—209